(12) United States Patent
Xu et al.

(10) Patent No.: US 10,883,345 B2
(45) Date of Patent: Jan. 5, 2021

(54) PROCESSING OF COMPUTER LOG MESSAGES FOR VISUALIZATION AND RETRIEVAL

(71) Applicant: NEC Laboratories America, Inc., Princeton, NJ (US)

(72) Inventors: Jianwu Xu, Lawrenceville, NJ (US); Tanay Kumar Saha, Indianapolis, IN (US); Haifeng Chen, West Windsor, NJ (US); Hui Zhang, Princeton Junction, NJ (US)

(73) Assignee: NEC Corporation

(*) Notice: Subject to any disclaimer, the term of this patent is extended or adjusted under 35 U.S.C. 154(b) by 277 days.

(21) Appl. No.: 16/034,663

(22) Filed: Jul. 13, 2018

(65) Prior Publication Data

US 2019/0073406 A1    Mar. 7, 2019

Related U.S. Application Data

(60) Provisional application No. 62/554,168, filed on Sep. 5, 2017.

(51) Int. Cl.
*G06F 16/45* (2019.01)
*E21B 43/08* (2006.01)
(Continued)

(52) U.S. Cl.
CPC .......... *E21B 43/082* (2013.01); *B01D 29/111* (2013.01); *B01D 29/216* (2013.01);
(Continued)

(58) Field of Classification Search
CPC ..... G06F 16/2237; G06F 16/285; G06F 16/26
See application file for complete search history.

(56) References Cited

U.S. PATENT DOCUMENTS 7,953,746 B1 * 5/2011 Garg .................. G06F 16/9032
   707/762
9,798,820 B1 * 10/2017 Premont-Schwarz ......................
   G06F 16/36

(Continued)

OTHER PUBLICATIONS

Ester, "A Density-Based Algorithm for Discovering Clusters in Large Spatial Databases with Noise", Proceedings of the Second International Conference on Knowledge Discovery and Data Mining, Aug. 1996, pp. 226-231.

(Continued)

*Primary Examiner* — Tarek Chbouki
(74) *Attorney, Agent, or Firm* — Joseph Kolodka

(57) ABSTRACT

A method and system are provided for processing computer log messages for log visualization and log retrieval. The method includes collecting log messages from one or more computer system components, performing a log tokenization process on the log messages to generate tokens, transforming the tokens into log vectors associated with a metric space, performing dimensionality reduction on the metric space to project the metric space into a lower dimensional sub-space, storing similarity distances between respective pairs of the log vectors, and in response to receiving a query associated with a query log message for reducing operational inefficiencies of the one or more computer system components, employing the similarity distances to retrieve one or more similar log messages corresponding to the query log message for reducing the operational inefficiencies of the one or more computer system components.

20 Claims, 6 Drawing Sheets

(51) Int. Cl.
*B01D 29/21* (2006.01)
*B01D 39/20* (2006.01)
*B01D 29/11* (2006.01)
*B01D 29/33* (2006.01)
*G06F 16/22* (2019.01)
*G06F 16/28* (2019.01)
*G06F 16/26* (2019.01)
*G06F 7/08* (2006.01)

(52) U.S. Cl.
CPC ............. *B01D 29/33* (2013.01); *B01D 39/20* (2013.01); *E21B 43/086* (2013.01); *G06F 7/08* (2013.01); *G06F 16/2237* (2019.01); *G06F 16/26* (2019.01); *G06F 16/285* (2019.01)

(56) References Cited

U.S. PATENT DOCUMENTS

2005/0234972 A1* 10/2005 Zeng ..................... G06F 16/951
2012/0254202 A1* 10/2012 Heinonen ............. G06F 16/215
  707/754
2016/0292592 A1  10/2016 Patthak et al.
2017/0111245 A1   4/2017 Ishakian et al.
2018/0060314 A1   3/2018 Xu et al.
2018/0102938 A1*  4/2018 Yoon ...................... G06F 11/30

OTHER PUBLICATIONS

Mikolov, "Distributed Representations of Words and Phrases and their Compositionality", Advances in Neural Information Processing Systems 26, Dec. 2013, pp. 1-9.
Van Der Maaten, "Learning a Parametric Embedding by Preserving Local Structure", Proceedings of the Twelfth International Conference on Artificial Intelligence & Statistics, Apr. 2009, pp. 384-391.
https://www.splunk.com, 2018, pp. 1-16.
https://www.elastic.co/products/kibana, 2018, pp. 1-16.
https://www.tableau.com, 2018, pp. 1-5.

* cited by examiner

200

```
┌─────────────────────────────────────────────┐
│   Count a total number of unique tokens.    │
│                    210                      │
└─────────────────────────────────────────────┘
                      ↓
┌─────────────────────────────────────────────┐
│ Choose a number of dimensions, d, for a     │
│ metric space.                               │
│                    220                      │
└─────────────────────────────────────────────┘
                      ↓
┌─────────────────────────────────────────────┐
│ Execute a model to learn vector representa- │
│ tions of the tokens in the d-dimensional    │
│ metric space.                               │
│                    230                      │
└─────────────────────────────────────────────┘
                      ↓
┌─────────────────────────────────────────────┐
│ Average the vector representations of each  │
│ of the tokens in a given log message to     │
│ obtain a d-dimensional vector representation│
│ for the given log message.                  │
│                    240                      │
└─────────────────────────────────────────────┘
```

FIG. 2

PROCESSING OF COMPUTER LOG MESSAGES FOR VISUALIZATION AND RETRIEVAL

RELATED APPLICATION INFORMATION

This application claims priority to provisional application Ser. No. 62/554,168, filed on Sep. 5, 2017, which is incorporated herein by reference herein in its entirety.

BACKGROUND

Technical Field

The present invention relates to data processing, and more particularly to systems and methods for processing computer log messages for log visualization and log retrieval.

Description of the Related Art

Logs, such as heterogeneous information technology (IT) operational logs, serve as inexpensive "sensors," recording and indicating the health status of enterprise computer systems. Many log processing and management systems are designed to analyze, understand and manage complex IT systems based on the logs. Logs can come from multiple sources written with different character encodings, where some logs may be written using single-byte encoding and other logs may be written using multi-byte encoding.

SUMMARY

According to an aspect of the present invention, a computer-implemented method for processing computer log messages for log visualization and log retrieval is provided. The method includes collecting, by at least one processor operatively coupled to a memory, log messages from one or more computer system components, performing, by the at least one processor, a log tokenization process on the log messages to generate tokens, transforming, by the at least one processor, the tokens into log vectors associated with a metric space, performing, by the at least one processor, dimensionality reduction on the metric space to project the metric space into a lower dimensional sub-space, storing, by the at least one processor, similarity distances between respective pairs of the log vectors, and in response to receiving a query associated with a query log message for reducing operational inefficiencies of the one or more computer system components, employing, by the at least one processor, the similarity distances to retrieve one or more similar log messages corresponding to the query log message for reducing the operational inefficiencies of the one or more computer system components.

According to another aspect of the present invention, a system for processing computer log messages for log visualization and log retrieval is provided. The system includes a memory device for storing program code. The system also includes a processor, operatively coupled to the memory device. The processor is configured to execute program code stored on the memory device to collect log messages from one or more computer system components, perform a log tokenization process on the log messages to generate tokens, perform dimensionality reduction on the metric space to project the metric space into a lower dimensional sub-space, store similarity distances between respective pairs of the log vectors, and in response to receipt of a query associated with a query log message for reducing operational inefficiencies of the one or more computer system components, employ the similarity distances to retrieve one or more similar log messages corresponding to the query log message for reducing the operational inefficiencies of the one or more computer system components.

According to yet another aspect of the present invention, a computer program product is provided. The computer program product includes a non-transitory computer readable storage medium having program instructions embodied therewith. The program instructions are executable by a computer to cause the computer to perform a method for processing computer log messages for log visualization and log retrieval. The method performed by the computer includes collecting log messages from one or more computer system components, performing a log tokenization process on the log messages to generate tokens, transforming the tokens into log vectors associated with a metric space, performing dimensionality reduction on the metric space to project the metric space into a lower dimensional sub-space, storing similarity distances between respective pairs of the log vectors, and in response to receiving a query associated with a query log message for reducing operational inefficiencies of the one or more computer system components, employing the similarity distances to retrieve one or more similar log messages corresponding to the query log message for reducing the operational inefficiencies of the one or more computer system components.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a block/flow diagram of a system/method for transforming tokenized logs into log vectors for each log message, in accordance with an embodiment of the present invention;

DETAILED DESCRIPTION OF PREFERRED EMBODIMENTS

Figure 1:
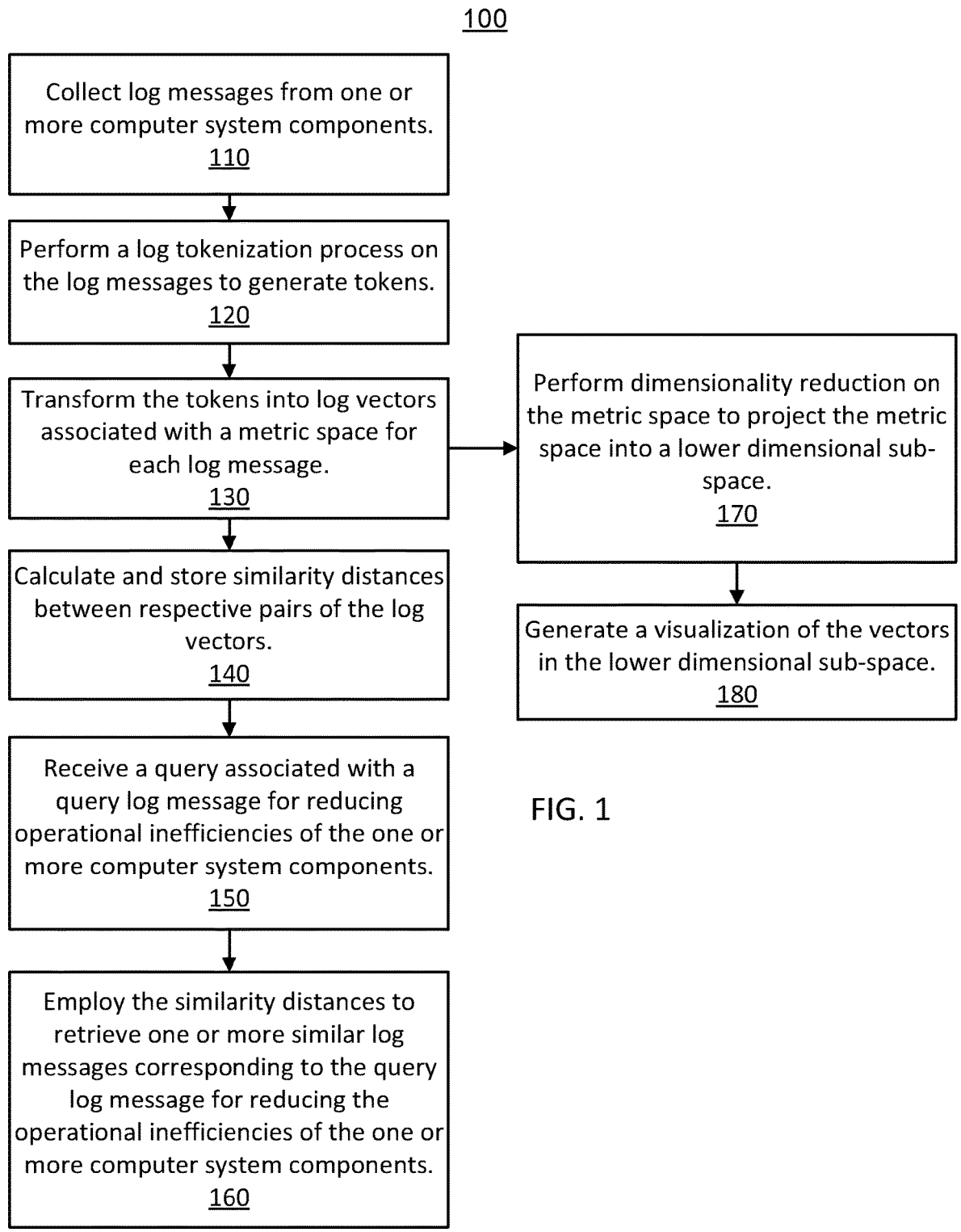
FIG. 1 is a block/flow diagram of a system/method for performing log processing and management, in accordance with an embodiment of the present invention.

The definition of similarity for logs could have multiple meanings. For example, the following two logs have different syntactic formats, but have similar semantic meanings:
   2017/08/15 10:12:23 2341 Information Reply: Drive Fault
   2017/08/15 12:34:03 382234 Reply: Drive Fault
A suitable log representation should capture the semantic similarity while tolerating syntactic format differences.

One of the challenges in log processing and management is being able to quickly retrieve similar logs for a given query log, while providing visualization of logs in a neighborhood. For example, existing solutions only provide visualization for log statistics (e.g., log counts per certain time period by parsing log with specific regular expressions or rules). These existing solutions do not have the capability of representing logs in an embedded metric space so that users can visualization the relative similarity across different logs. Such an ability can improve log processing and management by, e.g., helping users understand the overall structures of logs, as well as provide a visualization feature for a direct and intuitive insight of the unstructured logs.

The embodiments described herein provide for comprehensive log management systems and methods that implement a log transformation process for generating vector representations of logs (e.g., heterogeneous logs), referred to herein as "log 2vec," in a metric space (e.g., vector space) that captures the (relative) similarity among logs. For example, the vector representations can be generated based on deep modeling of natural language techniques. Based on the vector representations, similarity distances between respective pairs of the vectors can be measured and ranked for log retrieval purposes in accordance with the embodiments described herein. In addition, since the original metric space can have a high dimensionality that can be virtually impossible to visualize, the embodiments described herein can implement a dimensionality reduction technique to project the original metric space into a lower dimensional space for visualization (e.g., two-dimensional (2D) or three-dimensional (3D)). This can allow users to visualize the similarity across different logs to provide a direct visual impression of how logs are represented. Accordingly, the embodiments described herein can be used to enable a suitable vector representation of the logs for improved log searching, retrieval and visualization.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now in detail to the figures in which like numerals represent the same or similar elements and initially to FIG. 1, a block/flow diagram 100 illustrates a system/method for representing heterogeneous logs for visualization and retrieval to improve log processing and management systems.

At block 110, a log collection component collects log messages from one or more computer system components. The log messages can include unstructured text content with one or more fields, and can further include timestamps. In one embodiment, the log messages include heterogeneous logs. The log messages can be collected from computer system components that produce logs for recording system events, statuses, etc., such as arbitrary systems and/or software applications that produce logs. The collected log messages can be transported via any suitable manner, such as a streaming process, message transporter, file transfer, etc.

In the case where the log messages include heterogeneous logs collected from systems and services located in different time zones, different programs may record timestamps in different ways, including for example: epoch time, DD/MM/YYYY, DD/MM/YY, MM/DD/YYYY, MM/DD/YY, Month Day Year, Day Month Year, etc. To standardize the timestamps of the log messages, in one embodiment, entries in the log messages can be compared to a list of timestamp formats to identify the format of each log (or each entry), and the native timestamp format of each of the log messages can be converted or transformed into a target timestamp format. In one embodiment, the target timestamp format is Universal Time Coordinated (UTC) format. However, any suitable timestamp format can be selected the target timestamp format, as long as the same target timestamp format is consistently applied across all of the heterogeneous logs.

Because log messages can include unstructured text that may be mixed with numbers, symbols, and any possible alphabets, the log messages can be broken up into a set of smaller string chunks (called "tokens" herein) by employing tokenization (pre)processing. Tokens are the smallest units of the logs, which are the building element of a composite log. Tokenization can bring semi-structural information into unstructured logs.

At block 120, a log tokenization processing is performed on the log messages to generate tokens. The log tokenization processing can be performed by splitting the logs using a set of predefined delimiters or rules and/or user-supplied delimiters or rules. For example, an interface is provided for users to manually input rules to tokenize logs if any strings are matched against the input rules and/or for users to provide structure of a specific log format, such as, e.g., a comma-separated values (CSV) file format.

In one embodiment, at least one of fixed log tokenization and flexible log tokenization can be performed.

Fixed log tokenization can be performed by matching the log messages byte-by-byte against a set of fixed symbols and/or punctuation marks. This ensures that the substrings are split into multiple tokens if they are connected by any symbol or punctuation mark (including white space such as spaces and new lines).

Flexible log tokenization can be performed by matching each substring against a set of rules provided by a user. The set of user-supplied rules may be based on, e.g., regular expressions that are specific to specific logs or types of logs. The user-supplied rules may also include rules for extracting relevant information from the logs.

The log tokenization can be applied to single-byte character encodings (e.g., American Standard Code for Information Interchange or ASCII) and/or multi-byte character encodings (e.g., Unicode Transformation Format or UTF).

For example, ASCII symbol tokenization can be performed by inserting white space before and after a set of ASCII symbols or punctuation marks. This may be performed without any manual inputs according to a predefined set of symbols that is applied universally across the heterogeneous logs. One exemplary set of symbols may include, for example, the following single-byte symbols: ' ~ !, @ # $ % ^ & * ( ) + ={ } [ ]\|; ' "< >. ? ||. Each character of each log can be matched against each symbol in the above set. If a character is matched, then white space is inserted before and after that symbol. Some symbols are not considered in this set. For example, the forward slash, '/', is not in the set because this symbol is often used as a separator in uniform resource locator (URL) links. In the log processing and management system embodiments described herein, it can be more syntactically and semantically meaningful to keep an entire URL link together as one entity, rather than subject it to over-tokenization.

As another example, multi-byte symbol tokenization can be performed by inserting white space before and after each multi-byte symbol in each log. One exemplary set of multi-byte symbols may include, for example, the following multi-byte symbols: ' ~ ! @ # $ % ^ & *( ) _ + =『』 |; : ' < >? ○ | | ¥. When compared to the single-byte symbols set described above, the multi-byte symbols set includes many symbols with the same semantic meaning, but using a different character encoding.

At block 130, the tokenized logs are transformed into a representation in a vector format, or log vectors, for each log message (e.g., using log 2vec). The transformation can be based on a language modeling technique. For example, the transformation can use word embedding technology (e.g., word2vec) to project the tokens into a metric space (e.g., vector space). Then, each unique token can be assigned a corresponding vector in the metric space. Since the metric space can illustratively support vector algebraic operations, in one embodiment, an average of all of the corresponding vectors from the tokens in a given log message can be calculated, and the average can be denoted as the vector representation of the given log message.

Further details regarding the log vector representation process performed at block 130 will now be described with reference to FIG. 2.

Referring now to FIG. 2, a block/flow diagram 200 is provided illustrating an overview of a system/method for transforming the tokenized logs into log vectors for each log message.

At block 210, a total number of unique tokens in a tokenized log file are counted by, e.g., sorting the tokens of the tokenized log file, removing duplicate tokens from the sorted tokens, and counting remaining ones of the tokens.

At block 220, a number of dimensions, d, for a metric space (e.g., vector space) is chosen. The total number of unique tokens counted at block 210 corresponds to the maximum number of dimensions for the metric space that we would want to represent the tokens (e.g., upper bound for dimensionality). Since a dense representation can provide more interesting results, d can be chosen to be less than the total number of unique tokens. The metric space can include, e.g., several hundred dimensions. For example, d can range from, e.g., about 200 to about 500.

At block 230, a model is executed to learn vector representations of the tokens in the d-dimensional metric space. In one embodiment, the model includes a continuous bag of words (CBOW) model. Given a set of tokens of a log, the CBOW model can predict each of the tokens given some context token using the average d-dimensional vector representation of the tokens in the context window (averaging can dilute the word ordering). The CBOW model can be viewed as a multi-class classification model where the number of classes to be predicted is the same as the number of unique tokens. The CBOW model initializes the d-dimensional vectors of the tokens uniformly (at random), and can use a signal from the prediction stage to refine the initial d-dimensional vector representation. The CBOW model can adjust weights to correctly predict a token given a set of context tokens. For example, an illustrative tokenized log that includes spaces as a delimiter is provided as follows: "2017/08/15 10: 12: 23 2341 information reply: drive fault".

In this illustrative example, token information should be able to predict token reply given the corresponding d-dimensional representation. If the prediction is incorrect, the model can move the current d-dimensional representation in a direction which rectifies the loss.

At block 240, the vector representations of each of the tokens in a given log message are averaged to obtain a d-dimensional representation for the given log message by, e.g., summing up the vectors of each of the tokens in the given log message and dividing the sum by the total number of tokens.

Referring back to FIG. 1, at block 140, after the vector representations, or log vectors, are obtained for each log message, similarity distances between respective pairs of the log vectors are calculated. In one embodiment, the similarity distances are calculated using a similarity measure. For example, the similarity measure can include a Euclidean distance measure. As another example, the similarity measure can include a cosine distance measure. However, any suitable distance measure can be used in accordance with the embodiment described herein.

Illustratively, given two vectors $x_i$ and $x_j$, the Euclidean distance between the two vectors, dist ($x_i$ and $x_j$), can be defined as:

$$dist(x_i, x_j) = \sqrt[2]{\sum_{k=1}^{d} (x_i^k - x_j^k)^2}$$

where d is the dimensionality of the metric space. The smaller the value of dist ($x_i$ and $x_j$), the more similar $x_i$ and $x_j$ are in the metric space. Thus, if dist ($x_i$ and $x_j$)=0 $x_i$ and $x_j$ are identical vectors (e.g., the two original log messages corresponding to $x_i$ and $x_j$ include the same content).

The similarity distance component can further store each of the similarity distances for next stage processing. For example, the similarity distances can be stored in a database, such as, e.g., a Structured Query Language (SQL) database.

At block 150, a query associated with a query log message for reducing operational inefficiencies of the one or more computer system components is received.

At block 160, the similarity distance are employed to retrieve one or more similar log messages corresponding to the query log message for reducing the operational inefficiencies of the one or more computer system components. In one embodiment, an interactive query is performed to retrieve one or more of "closest" log messages to the given log message based on the similarity distances. For example, the log retrieval can be accomplished by sorting relative distances between the given log message and the other log messages.

Since there could be a large number of log messages (e.g., on the order of millions), in one embodiment, a cluster process can be performed in the metric space to group the log messages into smaller clusters to accelerate the log retrieval process (e.g., the sorting process can take a long time if the number of log messages is large). The number of clusters can be on the order of, e.g., hundreds, thereby significantly reducing log retrieval processing time.

Further details regarding the similar log retrieval process performed at block 160 will now be described with reference to FIG. 3.

Figure 3:
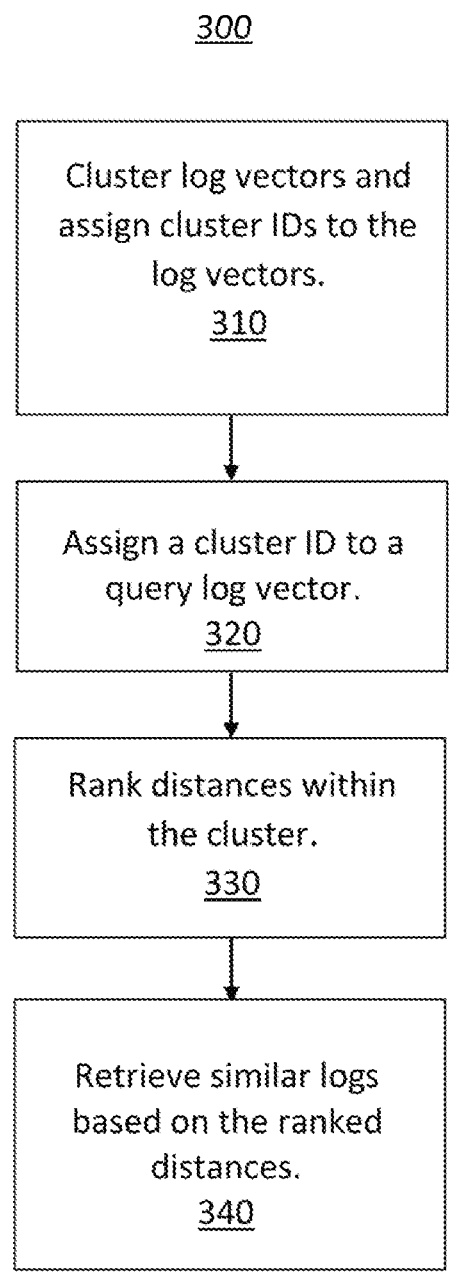
FIG. 3 is a block/flow diagram of a system/method for performing log retrieval, in accordance with an embodiment of the present invention.

Referring now to FIG. 3, a block/flow diagram 300 is provided illustrating a system/method for performing log retrieval.

At block 310, log vectors are clustered, and cluster IDs are assigned to the log vectors. The clustering can implement a divide-and-conquer approach to optimize the log retrieval functionality. For example, the log vectors in the metric space can be divided into multiple clusters based on a clustering technique. In one embodiment, the clustering technique includes a density-based spatial clustering of applications with noise (DBSCAN) technique. DBSCAN is a density based clustering technique that is able to group logs with similar content into the same cluster based on similarity distance (e.g., the similarity distance by the similarity distance component of FIG. 1). The log retrieval process will only need to search nearest neighbors within a certain cluster, instead of all of the original logs. The clustering technique can further assign a cluster identification (ID) for each log vector.

At block 320, a cluster ID is assigned to a query log vector of a query log in order to execute log retrieval within the cluster with the same cluster ID as the query log. The process for assigning the cluster ID to the query log vector is determined based on whether or not the query log associated with the query log vector is one of the original logs having a cluster ID assigned at block 310, or is a new log (e.g., new testing log). For example, if it is determined if the query log is included in the original logs, the cluster ID of the query log vector is simply obtained from the previously assigned cluster IDs.

However, if the query log is not included in the original logs, this implies that the query log is a new log. Thus, a vector representation for the query log ("query log vector") is generated to embed the new query log into the metric space (e.g., as described above with reference to FIGS. 1 and 2). Then, it is determined to which cluster the query log vector belongs. For example, the mean vector can be calculated for each of the clusters generated at block 310 by averaging all the log vectors within each cluster, and the distance (e.g., Euclidean distance) between the query log vector and each of the mean vectors can be computed and sorted. Accordingly, the mean vector corresponding to the smallest Euclidean distance will be determined as the cluster to which the query log vector is assigned, and the assigned cluster ID of the query log vector corresponds to that of the determined cluster.

At block 330, distances between the query log vector and the other log vectors of the corresponding cluster are ranked. In one embodiment, the ranking includes calculating a similarity distance (e.g., Euclidean distance) between the query log vector and the other log vectors, and sorting the other log vectors based on the similarity distances (e.g., in ascending order).

At block 340, similar logs are retrieved based on the ranked distances. For example, the top k ranked log vectors can be retrieved. The number k can be manually set by a user, or can be a default value.

Referring back to FIG. 1, since the metric space induced by the process performed at block 130 can include a large number of dimensions (e.g., hundreds), dimensionality reduction can be performed on the metric space to visualize the structure of the log messages.

To accomplish this, at block 170, dimensionality reduction is performed on the log vectors from the metric space (induced by the log2vec technique performed at block 130) to project the metric space into a lower dimensional sub-space (e.g., 2D metric space) for log visualization.

To preserve the local structure of the vectors, a locality preserving dimensionality reduction technique can be employed. In one embodiment, the dimensionality reduction technique employs a t-Distributed Stochastic Neighbor Embedding (t-SNE) technique, which is a nonlinear dimensionality reduction machine learning technique well-suited for embedding high-dimensional data for visualization in a low-dimensional space (e.g., 2D or 3D space). The t-SNE technique includes two general parts. First, t-SNE defines a probability distribution over pairs of high-dimensional objects so that similar objects have a high probability of being selected and dissimilar objects have a low probability of being selected. Second, t-SNE defines a similar probability distribution over the points in the lower-dimensional map, and minimizes the divergence (e.g., Kullback-Leibler divergence) between the two probability distributions with respect to the locations of the objects in the map. The technique can be implemented via Barnes-Hut approximations, thereby allowing it to be applied on large real-world datasets. Further details regarding the implementation of t-SNE will not be provided herein.

At block 180, a visualization of the vectors in the lower-dimensional sub-space is generated. The vectors can be visualized on a computer monitor by using a plotting software system for visualizing the vectors on a plot. The software system can provide for a graphical user interface (GUI) for visualizing the vectors. For example, the log visualization component can collect all of the vectors from the lower-dimensional sub-space, plot the collected vectors using the plotting software system to visualize the collected vectors, and display the plot on the computer monitor. Such functionality can improve log analysis by offering users a quick, direct and intuitive understanding and impression of the structure and organization of the original log messages. An exemplary log visualization plot will now be described with reference to FIG. 6.

Figure 6:
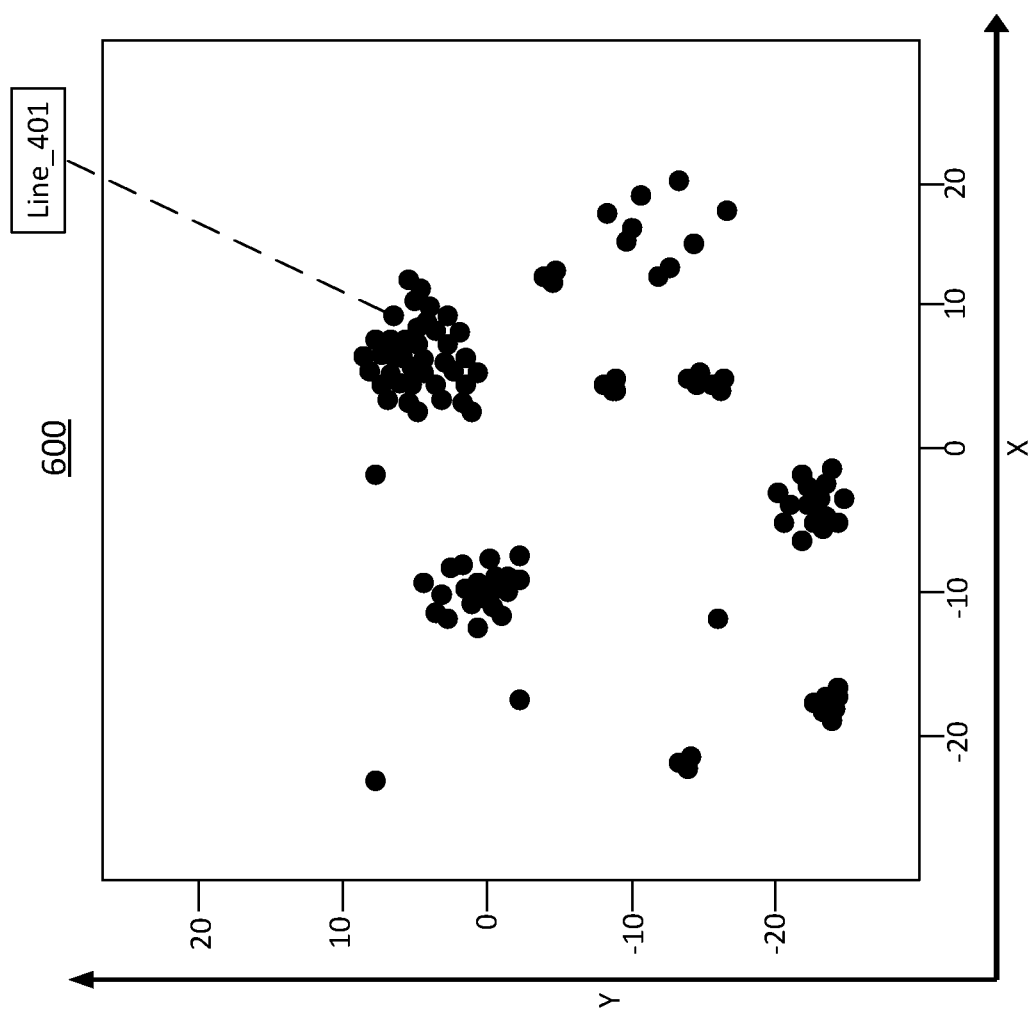
FIG. 6 is a plot showing an illustrative visualization of log messages in accordance with an embodiment of the present invention.

Referring now to FIG. 6, an exemplary plot 600 for visualizing log messages is shown. The plot 600 provides an illustrative example of vectors resulting from the dimensionality reduction (e.g., t-SNE dimensionality reduction) performed on the log vectors from the metric space to project the metric space into a lower dimensional sub-space (e.g., 2D metric space), as described above with reference to block 160 of FIG. 1.

The "X" axis of the plot 600 represents a first component of reduced dimension due to the dimensionality reduction, and the "Y" axis of the plot 600 represents a second component of reduced dimension due to the dimensionality reduction. The first and second components represent the two dominant directions where data resides with respect to locality preserving criterion.

Each point in the plot corresponds to an individual log message. Since each vector corresponds to a particular log message, the visualization provided by the plot 600 shows the structure and organization of a massive number of logs. Various lines are shown in the plot corresponding to locations of respective logs messages in the plot 600. For example, "Line_401" corresponds to the location of the log message line 401 in the plot 600. Accordingly, the plot 600 offers a quick and intuitive understanding and impression of the structure and organization of the original log messages.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 4:
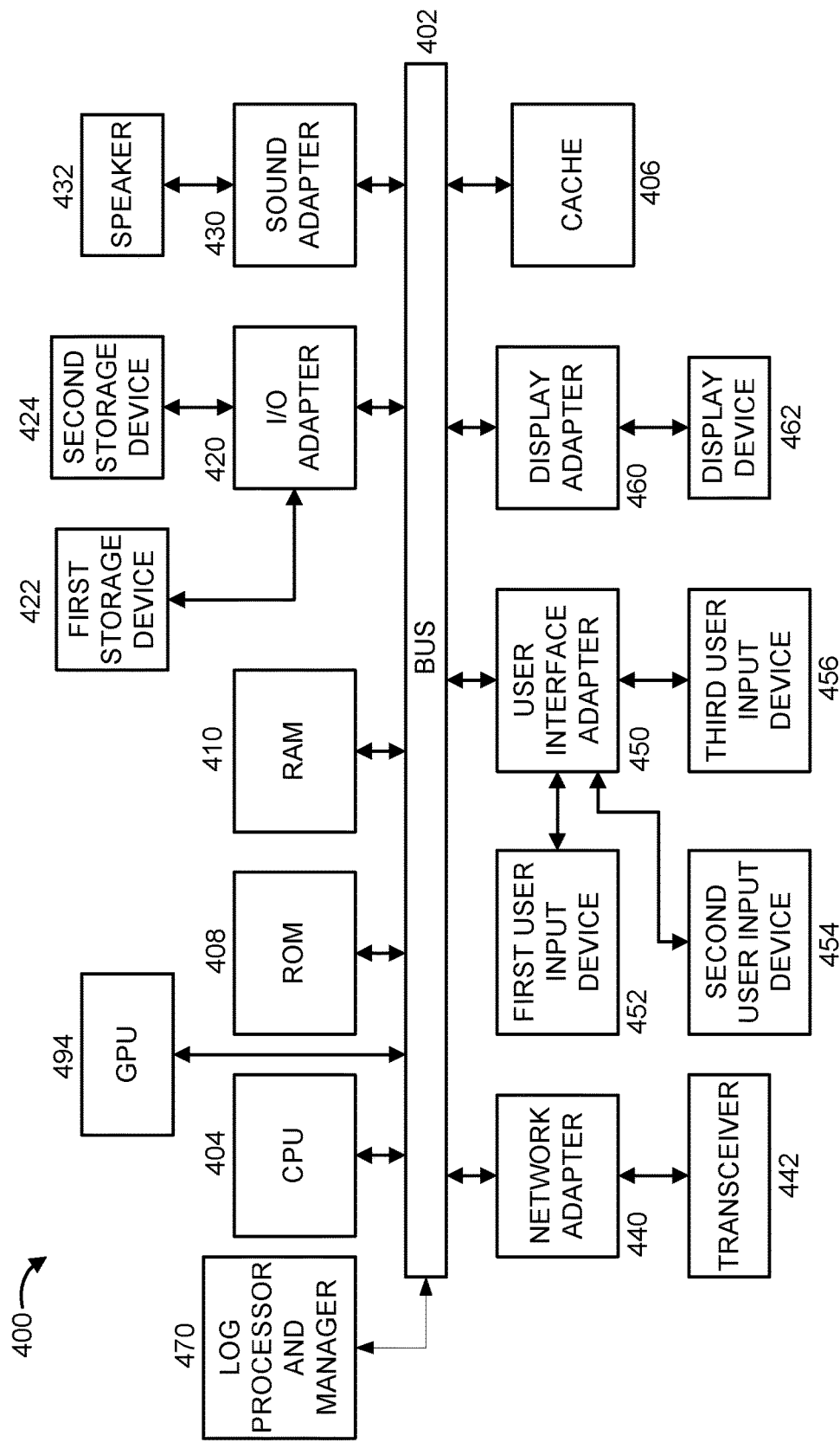
FIG. 4 is a block diagram of a processing system in accordance with an embodiment of the present invention.

Referring now to FIG. 4, an exemplary processing system 400 is shown which may implementing the embodiments described with reference to FIGS. 1-3. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Log processor and manager 470 may be operatively coupled to system bus 402. The log processor and manager 470 is configured to perform one or more of the operations described above with reference to FIGS. 1-3 and 6. The log processor and manager 470 can be implemented as a stand-alone special purpose hardware device, or may be implemented as software stored on a storage device. In the embodiment in which the log processor and manager 470 is software-implemented, although the anomaly detector is shown as a separate component of the computer system 400, the log processor and manager 470 can be stored on, e.g., the first storage device 422 and/or the second storage device 429. Alternatively, the log processor and manager 470 can be stored on a separate storage device (not shown).

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Figure 5:
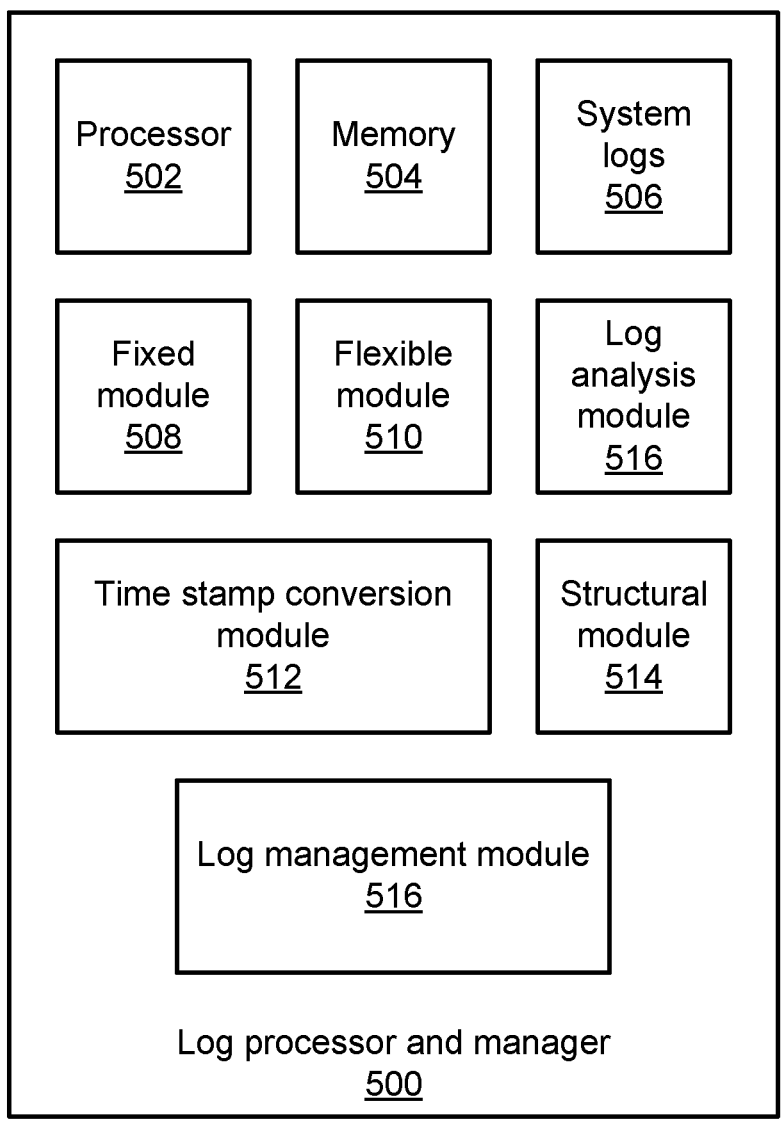
FIG. 5 is a block diagram of a log processor and manager in accordance with an embodiment of the present invention.

Referring now to FIG. 5, a log processor and manager system 500 is shown. The log processor and manager system 500 is shown including a hardware processor 502 and memory 504. The memory stores heterogeneous system logs 506 that are collected by, e.g., system event monitors or by one or more individual applications, each storing event information in a respective format in a log file. It should be understood that other types of logging are contemplated, and that the present embodiments include logging types that are not based in discrete files but may, for example, be kept in volatile memory or in any other storage mechanism. The log processor and manager system 500 further includes one or more functional modules that may, in some embodiments be implemented as software that is stored in memory 504 and that is executed by hardware processor 502. In alternative embodiments, the functional module(s) may be implemented as one or more discrete hardware components in the form of, e.g., application specific integrated chips or field programmable gate arrays.

The log processor and manager system 500 is shown including a fixed log tokenization module ("fixed module") 508 and a flexible log tokenization module ("flexible module") 510. The fixed module 508 performs fixed log tokenization based on a set of predefined delimiters or rules. The flexible module 510 performs flexible log tokenization based on a set of user-supplied delimiters or rules. Time stamp conversion module 512 can convert individual timestamps from the heterogeneous logs to a single target timestamp format. A structural tokenization module ("structural module") 514 then tokenizes the logs according to user-supplied structural information such as, e.g., a delimiter. Log analysis module 516 performs log analysis and management functions using the tokenized and standardized log information.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for processing computer log messages for log visualization and log retrieval, comprising:

collecting, by at least one processor device operatively coupled to a memory, a plurality of log messages from one or more computer system components to obtain collected log messages;

performing, by the at least one processor device, a log tokenization process on the collected log messages to generate tokens;

transforming, by the at least one processor device for each log message, the tokens into collected log vectors associated with a metric space, including, for each collected log message, averaging vector representations in the metric space to obtain a d-dimensional vector representation for the collected log message;

performing, by the at least one processor device, a locality preserving dimensionality reduction technique on the metric space to project the metric space into a lower dimensional sub-space;

storing, by the at least one processor device, similarity distances between respective pairs of the log vectors;

receiving, by the at least one processor device, a query associated with a query log message for reducing operational inefficiencies of the one or more computer system components;

determining, by the at least one processor device in response to receiving the query, which cluster of a plurality of clusters a query log vector corresponding to the query log message belongs to based on a cluster identification (ID) of the query log vector to obtain an identified cluster, wherein the collected log vectors are assigned cluster IDs corresponding to their respective clusters, and wherein each of the plurality of clusters includes at least one collected log vector with at least one of the plurality of clusters including at least two collected log vectors; and retrieving, by the at least one processor device, one or more similar log messages corresponding to the query log message for reducing the operational inefficiencies of the one or more computer system components based on a ranking of respective similarity distances between the query log vector of the identified cluster and the at least one collected log vector of the identified cluster.

2. The computer-implemented method of claim 1, wherein transforming the tokens into the collected log vectors further comprises:
determining a total number of unique tokens in a tokenized log file;
choosing a number of dimensions d for the metric space; and
executing a model to learn the vector representations in the metric space.

3. The computer-implemented method of claim 2, wherein determining the total number of unique tokens in the tokenized log file further comprises sorting the tokens of the tokenized log file to obtain sorted tokens, removing any duplicate tokens from the sorted tokens, and counting remaining ones of the sorted tokens.

4. The computer implemented method of claim 2, wherein the model includes a continuous bag of words (CBOW) model.

5. The computer-implemented method of claim 1, further comprising:
determining, by the at least one processor device, that the query log message is not included in the collected log messages; and
generating, by the at least one processor device, the query log vector to embed the query log vector into the metric space;
wherein the identified cluster is determined in response to generating the query log vector prior to assigning the cluster ID to the query log vector.

6. The computer-implemented method of claim 1, wherein clustering the log vectors includes employing a density-based spatial clustering of applications with noise (DSCAN) technique.

7. The computer-implemented method of claim 1, wherein ranking the respective similarity distances further comprises:
calculating a similarity distance between the query log vector and each collected log vector of the identified cluster; and
sorting each collected log vector of the identified cluster based on each similarity distance.

8. The computer-implemented method of claim 1, wherein the locality preserving dimensionality reduction technique includes a t-Distributed Stochastic Neighbor Embedding (t-SNE) technique.

9. The computer-implemented method of claim 1, further comprising generating, by the at least one processor device, a visualization of log vectors in the lower dimensional sub-space.

10. The computer-implemented method of claim 1, wherein the similarity distances are stored in a database that includes a Structured Query Language (SQL) database.

11. A system for processing computer log messages for log visualization and log retrieval to improve log processing and management systems, comprising:
a memory device for storing program code;
at least one processor device operatively coupled to the memory device and configured to execute program code stored on the memory device to:
collect a plurality of log messages from one or more computer system components to obtain collected log messages;
perform a log tokenization process on the collected log messages to generate tokens;
transform the tokens into collected log vectors associated with a metric space by, for each collected log message, averaging vector representations in the metric space to obtain a d-dimensional vector representation for the collected log message;
perform a locality preserving dimensionality reduction technique on the metric space to project the metric space into a lower dimensional sub-space;
store similarity distances between respective pairs of the log vectors;
receive a query associated with a query log message for reducing operational inefficiencies of the one or more computer system components;
determine which cluster of a plurality of clusters a query log vector corresponding to the query log message belongs to based on a cluster identification (ID) of the query log vector to obtain an identified cluster, wherein the collected log vectors are assigned cluster IDs corresponding to their respective clusters, and wherein each of the plurality of clusters includes at least one collected log vector with at least one of the plurality of clusters including at least two collected log vectors; and
retrieve one or more similar log messages corresponding to the query log message for reducing the operational inefficiencies of the one or more computer system components based on a ranking of respective similarity distances between the query log vector of the identified cluster and the at least one collected log vector of the identified cluster.

12. The system of claim 11, wherein, in transforming the tokens into the collected log vectors, the at least one processor device is further configured to execute program code to:
determine a total number of unique tokens in a tokenized log file by sorting the tokens of the tokenized log file, removing duplicate tokens from the sorted tokens, and counting remaining ones of the tokens;

choose a number of dimensions d for the metric space; and execute a model to learn vector representations in the metric space.

13. The system of claim 11, wherein the at least one processor device is further configured to execute program code to:

determine that the query log message is not included in the collected log messages; and generate the query log vector to embed the query log vector into the metric space;

wherein the identified cluster is determined in response to generating the query log vector prior to assigning the cluster ID to the query log vector.

14. The system of claim 11, wherein, in ranking the respective distances, the at least one processor device is further configured to execute program code to:

calculate a similarity distance between the query log vector and each collected log vector of the identified cluster; and sort each collected log vector of the identified cluster based on the similarity distances.

15. The system of claim 11, wherein the locality preserving dimensionality reduction technique includes a t-Distributed Stochastic Neighbor Embedding (t-SNE) technique.

16. The system of claim 11, wherein the at least one processor device is further configured to execute program code stored on the memory device to generate a visualization of log vectors in the lower dimensional sub-space.

17. The system of claim 11, wherein the similarity distances are stored in a database that includes a Structured Query Language (SQL) database.

18. A computer program product comprising a non-transitory computer readable storage medium having program instructions embodied therewith, the program instructions executable by a computer to cause the computer to perform a method for processing computer log messages for log visualization and log retrieval to improve log processing and management systems, the method performed by the computer comprising:

collecting a plurality of log messages from one or more computer system components to obtain collected log messages;

performing a log tokenization process on the collected log messages to generate tokens;

transforming the tokens into collected log vectors associated with a metric space including, for each collected log message, averaging vector representations in the metric space to obtain a d-dimensional vector representation for the collected log message;

performing a locality preserving dimensionality reduction technique on the metric space to project the metric space into a lower dimensional sub-space;

storing similarity distances between respective pairs of the log vectors;

receiving a query associated with a query log message for reducing operational inefficiencies of the one or more computer system components;

determining which cluster of a plurality of clusters a query log vector corresponding to the query log message belongs to based on a cluster identification (ID) of the query log vector to obtain an identified cluster, wherein the collected log vectors are assigned cluster IDs corresponding to their respective clusters, and wherein each of the plurality of clusters includes at least one collected log vector with at least one of the plurality of clusters including at least two collected log vectors; and retrieving one or more similar log messages corresponding to the query log message for reducing the operational inefficiencies of the one or more computer system components based on a ranking of respective similarity distances between the query log vector of the identified cluster and the at least one collected log vector of the identified cluster.

19. The computer program product of claim 18, wherein the method further includes:

determining that the query log message is not included in the collected log messages; and generating the query log vector to embed the query log vector into the metric space;

wherein the identified cluster is determined in response to generating the query log vector prior to assigning the cluster ID to the query log vector.

20. The computer program product of claim 18, wherein the method further includes generating a visualization of log vectors in the lower dimensional sub-space.

* * * * *